United States Patent [19]

Olsen

[11] 4,431,629
[45] Feb. 14, 1984

[54] METHOD OF PRODUCING AN EGG WHITE SUBSTITUTE MATERIAL

[75] Inventor: Hans A. S. Olsen, Vanlose, Denmark

[73] Assignee: Novo Industri A/S, Denmark

[21] Appl. No.: 261,006

[22] Filed: May 6, 1981

[30] Foreign Application Priority Data

May 13, 1980 [DK] Denmark .............................. 2079/80

[51] Int. Cl.³ .................. A23L 1/20; C12P 21/06; C12R 1/10
[52] U.S. Cl. .................................. 426/46; 435/69; 435/836
[58] Field of Search ................ 426/44, 46, 431; 435/69, 836

[56] References Cited

U.S. PATENT DOCUMENTS

| | | | |
|---|---|---|---|
| 3,932,672 | 1/1976 | Pour-El et al. .................. | 426/46 |
| 4,015,019 | 3/1977 | Sawada et al. .................. | 426/46 |
| 4,018,752 | 4/1977 | Bühler et al. .................. | 426/656 |
| 4,091,118 | 5/1978 | de Rham .................. | 426/46 |
| 4,100,024 | 7/1978 | Adler-Nissen .................. | 426/46 |
| 4,293,571 | 10/1981 | Olofsson et al. .................. | 426/44 |

Primary Examiner—Raymond N. Jones
Assistant Examiner—Elizabeth J. Curtin
Attorney, Agent, or Firm—Fidelman, Wolffe & Waldron

[57] ABSTRACT

Method of producing an egg white substitute material from soy protein. The method comprises extraction of a defatted soy bean material at a pH between about 6.0 and 10.5, separation, subjection of the supernatant to one or more ultrafiltrations and proteolytic hydrolysis of the supernatant or some fraction thereof to a DH between 1 and 8. The hydrolyzed soy material exhibits both a superior whipping or emulsifying ability and a good nutritional value, and it has no bitter taste.

17 Claims, 7 Drawing Figures

HYDROLYSIS CURVES FOR SOY PROTEIN ISOLATES.

HYDROLYSIS PARAMETERS:
 CONC. OF SUBSTRATE  S = 8% N × 6.25
 CONC. OF ENZYME  E/S = 2.0% ALCALASE  0.6 L (E = 0.16%)
 pH = 8.0; T = 50°C

FIG. 7

EFFECT OF pH ON WHIPPING EXPANSION OF A DH 6% ENZYMATIC HYDROLYSATE OF ULTRAFILTERED SOY PROTEIN ISOLATE.

METHOD OF PRODUCING AN EGG WHITE SUBSTITUTE MATERIAL

INTRODUCTION

The invention relates to an egg white substitute material, which is a protein derivative exhibiting whipping or emulsifying properties and which can be produced by treatment of a soy protein substrate with a proteolytic enzyme, and to a method for producing same.

BACKGROUND OF THE INVENTION

An egg white substitute material can be used in a wide variety of nutritional materials and in confectionaries like meringues. In selecting egg white substitute materials, two main factors have to be taken into consideration, namely whether or not the egg white substitute material has nutritional value and the degree of whipping or emulsifying ability exhibited by the substitute material.

Thus, a protein derivative, which is an enzyme hydrolyzed acid precipitated soy isolate, is described in "Functionality and Protein Structure," ACS Symposium 92, 1979, pages 125 to 146 (J. Adler-Nissen and H. Sejr Olsen, "The Influence of Peptide Chain Length on Taste and Functional Properties of Enzymatically Modified Soy Protein"), from which it appears that a series of hydrolyzates of acid precipitated soy protein have been prepared using different enzymes and different DH-values (DH is an abbreviation for degree of hydrolysis, defined hereinafter), from which it was discovered that both the whipping and emulsifying properties of these soy protein hydrolyzates had an optimum in a certain DH interval. The whipping and emulsifying ability of these soy protein hydrolyzates is good, but open to improvement.

Also, soy protein derivatives with excellent whipping properties are known, but they do not have a sufficiently high nutritional value, and may even be bitter, which characteristic limits their application in food formulations. See, for example, J. Am. Oil Chemists' Soc., March 1979, Vol. 56, pages 345 to 349.

Thus, a need exists for an egg white substitute material based on soy protein, which exhibits excellent whipping or emulsifying ability and good nutritional value combined with the absence of bitterness.

BRIEF STATEMENT OF THE INVENTION

The first aspect of the present invention provides a method for producing an egg white substitute material based on soy protein, which method comprises extracting a defatted soy bean material with an aqueous medium at a pH in the range of from about 6.0 to about 10.5, separating the solid material from the supernatant and thereafter subjecting the supernatant to one or more ultrafiltration steps. At a convenient point during the procedure proteolytic hydrolysis is carried out on the supernatant or a fraction thereof, whereby the protein is hydrolyzed proteolytically to a DH in the range of from 1 to 8, the proteolytic activity being inactivated after the proteolytic hydrolysis.

The second aspect of the present invention relates to the whipping or emulsifying product resulting from the herein described method.

DISCUSSION OF THE INVENTION

To facilitate understanding of practice of this invention, included herein are the attached drawings wherein.

In all aspects of this invention the starting substance is a form of defatted soy material such as soy bean meal, flakes, flour, etc. the supernatant after the extraction normally contains the majority of the protein in the, defatted soybean material serving as the raw material. However, the defatted soy bean material may also serve as raw material if pretreated in such a manner that 50% of the protein present in the defatted soy bean material is extracted.

Generally speaking the process of this invention involves concommitantly a controlled conversion of soy derived proteins into a protein hydrolyzate, and a recovery of the protein hydrolyzate in the form of relatively pure protein isolate, for example, a 90% protein product. All modes of the process involve the sequence steps common to FIGS. 1-4 of:

1. Extracting the soy material with an aqueous medium for purposes of dissolving the protein; and
2. Ultrafiltration of the extract phase for purposes of removing therefrom low molecular weight materials (e.g., dissolved substances of molecular weight below about 1000).

In addition, all modes of the process involve a controlled proteolytic hydrolysis of the dissolved protein in the extract. The proteolytic hydrolysis, followed by deactivation of the proteinase activity may be carried out virtually at the convenience of the plant operator, e.g., either just prior to recovery of the extract phase from the initial extraction mixture, or just subsequent, or after an initial ultrafiltration. To indicate the variable placement of the enzymatic hydrolysis step used herein is the phrase "supernatant or a fraction thereof".

The term "supernatant or a fraction thereof" is intended to refer to one or more of the following materials:

1. The extraction mixture before separation of the supernatant.
2. The supernatant from the extraction before ultrafiltration.
3. The retentate from the first ultrafiltration, before this retentate is subjected to a second ultrafiltration.
4. The retentate from the last ultrafiltration.

Surprisingly, it has been found that the egg white substitute material produced according to the invention fulfills the above described need. Specifically, it has been found that an egg white substitute material according to the invention exhibits a high whipping or emulsifying ability at a pH around 4. This property is particularly interesting in consideration of the fact that many natural or commercial protein products have a poor whipping or emulsifying ability at a pH around 4; reference is made to Eldridge, A. C., et al., "Stable Foams from Unhydrolyzed Soy Bean Proteins," Food Technology 17 (12) 120-123 (1963). Also, surprisingly, it has been found that the egg white substitute material produced according to the invention exhibits an excellent ability to heat set due to heat coagulation.

Herein and in the accompanying claims, the term "ultrafiltration" is used to include not only ultrafiltration proper, but also modified ultrafiltrations, especially diafiltration.

A method similar to that of the present invention, but without enzymatic hydrolysis, is described in Lebensm.-Wiss. U. Technol., 11, 57-64 (1978), "Continuous Pilot Plant Production of Bean Protein by Extraction, Centrifugation, Ultrafiltration, and Spray-drying" by Hans Sejr Olsen, in which paper, in particular, ultrafiltration for soy bean proteins as well as for faba bean proteins is described with regard to optimal purification of the protein material.

The isolated partially hydrolyzed retentate product of the method of the present invention has a high nutritional value and, surprisingly, it has been found to exhibit an extremely high whipping and emulsifying ability.

In a preferred embodiment of the method according to the invention the ultrafiltration or the ultrafiltrations are performed by means of a membrane with a nominal cut-off value for molecular weight in the range of about 1000 to about 30,000. The definition of nominal cut-off value for molecular weight used is taken from "Amicon Technical Data," publication no. 435V (Amicon Ltd., 57 Queens Road, High Wycombe, Buckinghamshire, UK), page 3: "The cut-off level refers to the molecular weight (of a globular solute) at which the membrane exhibits 90% rejection."

The above indicated critical cut-off values for molecular weight of 1000 or of 30,000 to cite both ends of the cut-off range necessarily is of an approximate nature. In the first place a membrane which rejects substantially all branched or globular molecules with a molecular weight above 1000 or 30,000 do not necessarily reject straight chain molecules with a molecular weight above 1000 or 30,000 to the same extent. In the second place, a membrane which in the initial phase of the ultrafiltration does not reject molecules with a molecular weight above 1000 or 30,000 may later reject such molecules due to cake formation on the surface of the membrane.

Any proteolytic enzyme which is able to generate a DH between 1 and 8 can be used; trypsin, however, is not the best choice, as trypsin is only active when it is added in an excess in relation to the trypsin soy inhibitor. Microbial proteinases are preferred and of this class of proteinases neutral or alkaline proteinases are the more preferred.

In a preferred embodiment of the method according to the invention the hydrolysis is carried out on the supernatant prior to separation of the solid material therefrom.

In a preferred embodiment of the method according to the invention, defatted soy bean material is extracted with neutral tap water, to which has been added a base to provide a pH of around 8.0.

In a preferred embodiment of the method according to the invention, the ratio between the weight of the aqueous medium used for the extraction and the weight of the defatted soy bean material, that is the extraction ratio, is selected in such a manner that $$5 \leq \frac{\text{weight of aqueous medium}}{\text{weight of soy bean material}} \leq 20$$

If the above extraction ratio has a value of more than 20, the concentration of salts in the extract and the ion strength will tend to be so low that the soy proteins, which are globulin proteins, cannot be solubilized completely, thus rendering the extraction yield too low. If the above extraction ratio has a value of less than 5, the extract is difficult to handle and the yield of extract is low when a centrifuge is used for separation. Furthermore, an unsatisfactorily small fraction of the low molecular compounds passes into the permeate. However, by keeping the extraction ratio between the above two limits, it is possible to obtain a product in which the proportion protein/total dry matter >85/100, the protein being calculated as N×6.25.

In a preferred embodiment of the method according to the invention, the solid material is separated from the supernatant by means of a decanter followed by a solids-ejecting centrifuge. This is an inexpensive and efficient way of performing a separation.

In another preferred embodiment of the method according to the invention, the supernatant is subjected to an ultrafiltration and a subsequently performed diafiltration, in such a manner that the final protein content of the dry matter ≧90 percent.

In a preferred embodiment of the method according to the invention the ultrafiltration or the ultrafiltrations are performed at a temperature in the range of from ambient temperatures to about 60° C., preferably around 50° C.

In a preferred embodiment of the method according to the invention the proteolytic hydrolysis is performed by addition of a food grade microbial neutral or alkaline proteolytic enzyme. As representatives for such enzymes NEUTRASE ® (a neutral proteinase produced by the microorganism *B. subtilis*) and ALCALASE ® (an alkaline proteinase produced by the microorganism *B. licheniformis*) may be mentioned. It should be understood that derivatives of such enzymes, especially destabilized proteolytic enzymes, as described in Danish patent application No. 2674/80 filed June 23, 1980, can be used in the process according to the invention.

In a preferred embodiment of the method according to the invention, the proteolytic hydrolysis is carried out through addition of a bacterial protease produced by means of *B. licheniformis*. A preferred example of such proteolytic enzyme is the commercial product ALCALASE ® (subtilisin Carlsberg) produced by NOVO INDUSTRI A/S. This enzyme is able to split the protein chain with such high hydrolysis rates that the minimum of DH is generally quickly reached. It is preferred that the proteolytic hydrolysis is carried out with an enzyme activity of at least 5 Anson units/kg of protein. If a lower activity is used, the hydrolysis time will normally be unduly high and putrefaction is liable to occur. The enzyme activity unit referred to above in terms of Anson units is determined according to the modified Anson method described in Novo Enzyme Information IB 058e-GB (the original Anson method is described in Journal of General Physiology, 22, 79-89 [1939]). One of the enzyme preparations used in the following Examples is ALCALASE ®0.6 L, which is a liquid preparation with a proteolytic activity of 0.6 Anson units/g preparation.

In a preferred embodiment of the method according to the invention the proteolytic hydrolysis is performed by addition of a bacterial protease produced by *B. licheniformis* that subsequently has been acylated, as is described in Danish patent application No. 2674/80 (alternatively, see U.S. Ser. No. 241,852, filed Mar. 9, 1981). The inactivation of the proteolytic enzyme can then be carried out by heating under very mild thermal conditions which do not denature the protein at all, as explained in detail in Danish patent application No. 2674/80, to which reference is made for the details of the acylated proteinase.

It is furthermore preferred that the concentration of the substrate (protein) in solution is at least 2.5 percent w/w. This allows the enzyme to be utilized optimally.

Advantageously, in the method according to the invention the proteolytic hydrolysis is performed to a DH in the range of from 3 to 8.

Preferably the inactivation is performed by adjustment of the pH with an acid, preferably hydrochloric acid, to at least 2 pH units below the optimum of the proteolytic enzyme used to perform the partial hydrolysis; this pH-value is maintained for at least 30 minutes at 50° C. After such treatment, the proteolytic activity will be inactivated completely and the pH-value of the thus treated supernatant or fraction of the supernatant can be readjusted to around neutrality.

Figure 1:
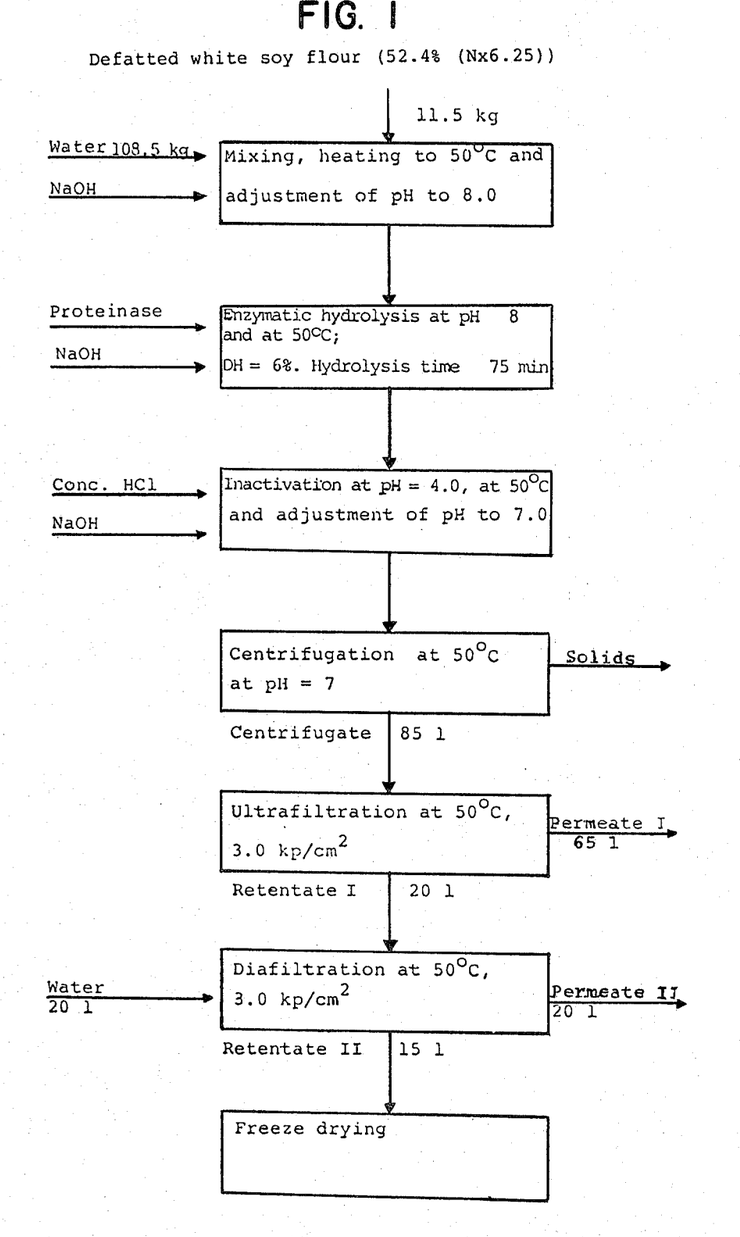
FIG. 1 illustrates in block form one flow sheet for practice of this invention.

In one preferred embodiment of the method according to the invention, proteolytic hydrolysis is carried out on the extraction mixture, then the inactivated hydrolysis mixture is separated into a supernatant containing the main part of the soy protein and a solid phase, preferably by means of a centrifuge, as for example according to the flow sheet of FIG. 1.

Figure 3:
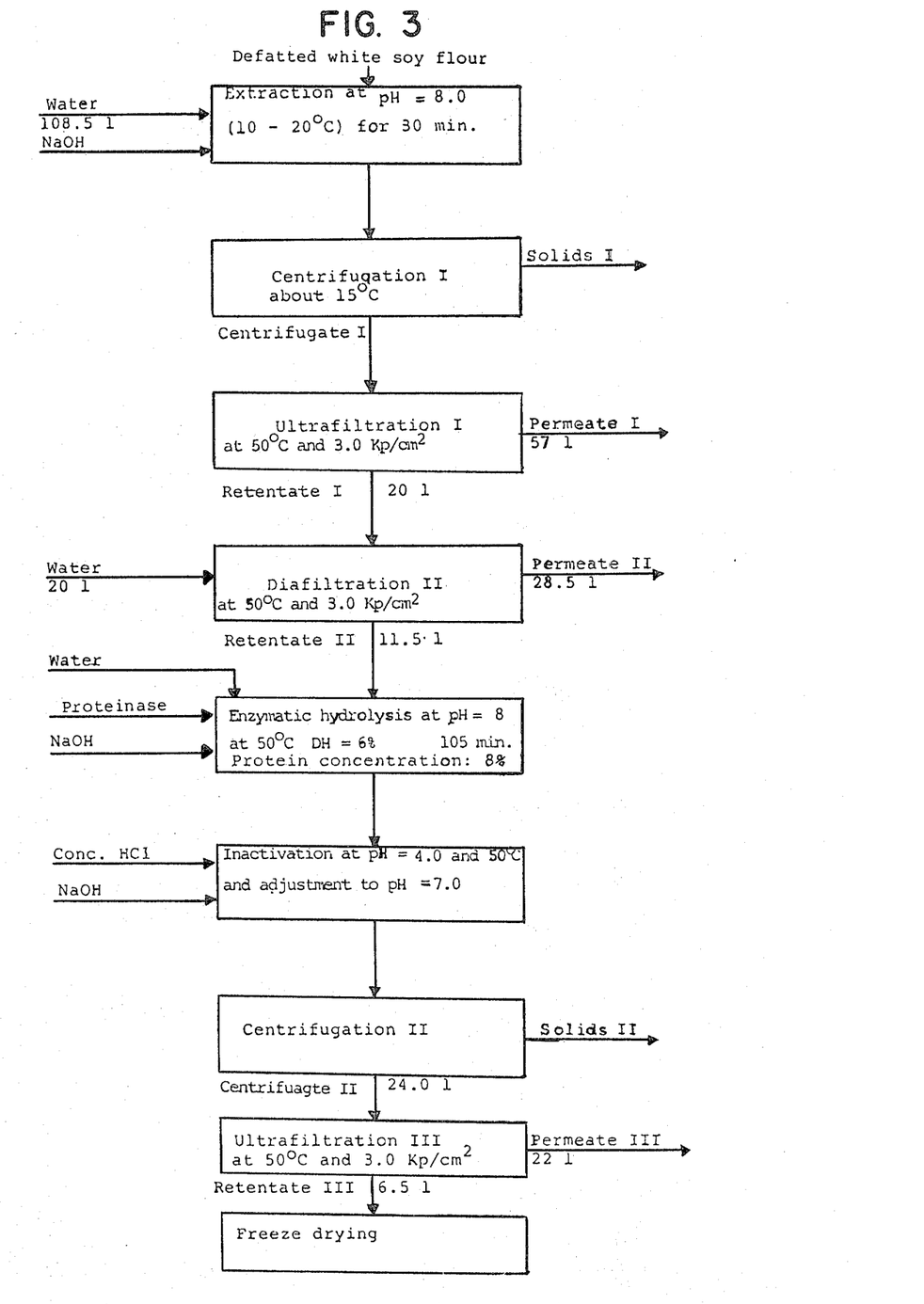
FIG. 3 illustrates in block form a third flow sheet for practice of this invention.

In another preferred embodiment two ultrafiltrations are performed, and the proteolytic hydrolysis is performed on the retentate originating from the first ultrafiltration. Advantageously, the partially hydrolyzed retentate without any proteolytic activity therein is isolated in solid form. The isolation of the partially hydrolyzed retentate can be carried out by means of spray-drying. FIG. 3 illustrates a flow sheet according to this embodiment.

According to the second aspect of the present invention there is provided the whipping or emulsifying agent produced by the methods herein described as the first aspect of the present invention.

As has already been pointed out the term "defatted soy material" is intended to include defatted soy bean flour, defatted soy bean flakes, white flakes, meal or similar soy bean based materials.

Since the pH used during the extraction, that is a pH in the range from about 6.0 to about 10.5, is well above pH 4.5 (the isoelectric point of the majority of the soy proteins) normally almost all soy proteins pass into solution during the extraction, if the raw material has not been heat treated or contains denatured protein.

The most preferred membrane for the ultrafiltration(s) is a membrane of the type GR6-P, from De Danske Sukkerfabrikker A/S as indicated later in Example 2 to 4. By means of this membrane ultrafiltrations can be performed at 50° C., which is the preferred ultrafiltration temperature, and also this membrane can be cleaned thoroughly before reuse, without any detrimental effect on the membrane. Furthermore, this membrane is stable and exhibits a suitable cut-off value for molecular weight after a short initial cake formation period which is inside the 1000–30,000 molecular weight range. By using this membrane, a hydrolyzate with an extremely high foam stability and meringues with a density and texture most similar to the density and texture of meringues manufactured on the basis of egg white can be obtained.

The degree of hydrolysis (DH) is defined by the equation $$DH = \frac{\text{Number of peptide bonds cleaved}}{\text{Total number of peptide bonds}} \times 100 \text{ percent}$$

Reference is made to J. Adler-Nissen, J. Agric. Food Chem., Vol. 24, No. 6, (1976), pages 1090–1093, where a more detailed discussion of the definition of DH appears.

The number of the peptide bonds cleaved can be measured by means of the TNBS method. The TNBS method is described by J. Adler-Nissen, "Determination of the Degree of Hydrolysis of Food Protein Hydrolyzates by Trinitro-benzenesulfonic Acid," J. Agric. Food Chem., Vol. 27, No. 6, pages 1256–1262 (1979).

Figure 5:
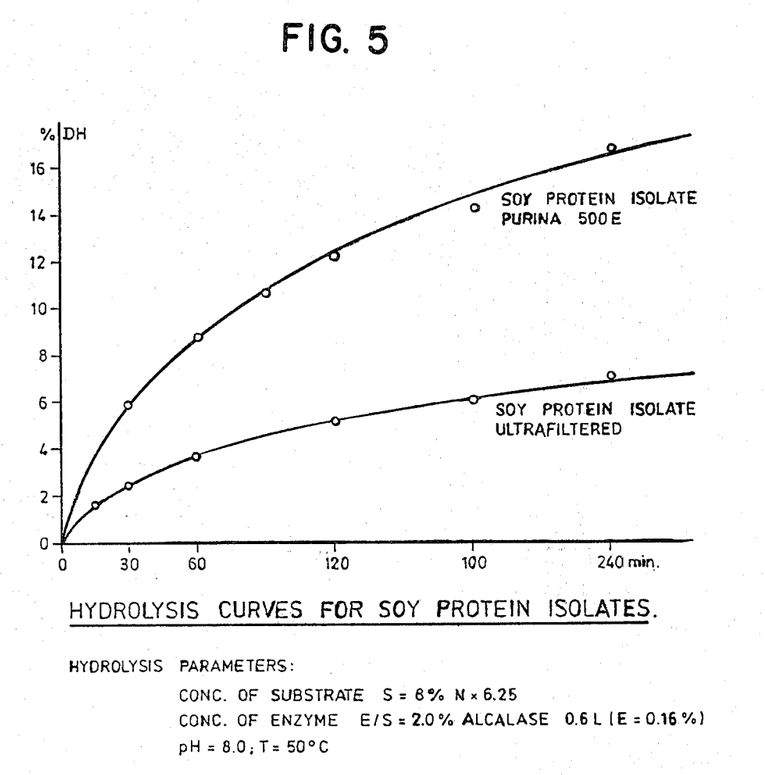
FIG. 5 is a set of hydrolysis curves for soy protein isolates.

The DH can also be determined if the course of hydrolysis is followed by means of the pH STAT method, as described by C. F. Jacobsen, J. Leonis, K. Linderstrøm-Lang, M. Ottesen, "The pH STAT and its use in Biochemistry," by D. Glick, (edit.), "Methods of Biochemical Analysis," Vol. IV, pages 171–210, Interscience Publishers, Inc., New York (1957). In this connection reference is made to FIG. 5 of the accompanying drawing, which shows a graph of DH versus time, for an isolate according to the present invention (native protein) and for an acid precipitated (denatured) protein.

Figure 6:
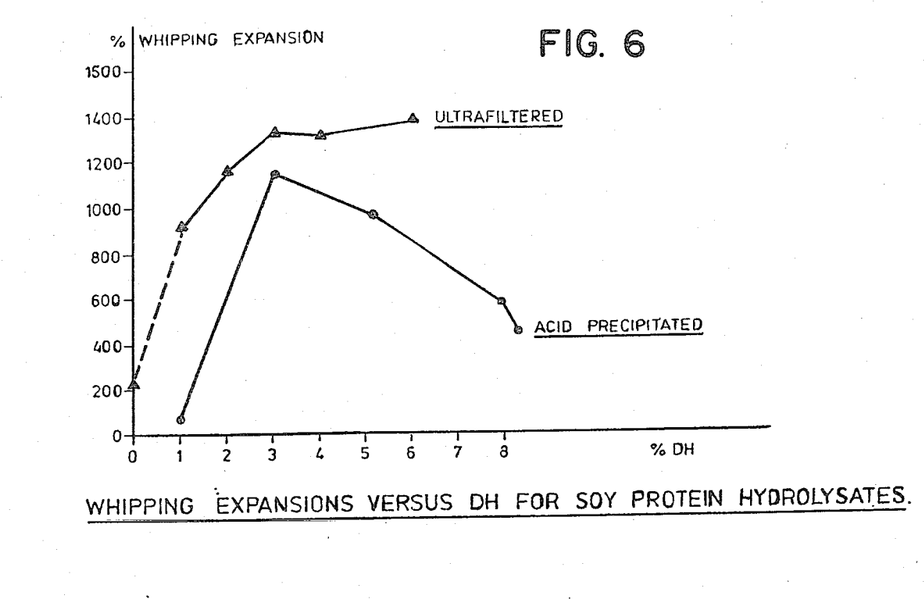
FIG. 6 is a graph of whipping expansion plotted the DH for soy protein isolates.

DH plays an important role in the invention, in that the hydrolysis is controlled by means of the DH; when the DH has reached a critical value, i.e., the range of 1–8, the hydrolysis should be terminated. The DH is, so to speak, the main parameter of the hydrolysis. If DH is too high, bitter tasting products are produced; if the DH is too low, no significant improvement in the whipping and emulsifying properties are obtained. In this connection reference is made to FIG. 6 of the accompanying drawings, which shows a graph of whipping ability versus DH for an isolate according to the present invention and for an acid precipitated isolate.

The emulsifying ability and the whipping expansion are measured according to the previously cited article in the ACS Symposium 92, (pages 129–130, "Emulsifying Capacity" and "Whipping Expansion"), with the exception that the pH of the protein dispersion is adjusted to 4.0 and 7.0, respectively.

Foam stability is to be measured in the following manner: B grams of foam are transferred to a plastic cylinder with a diameter of 7 cm and a height of 9 cm and in the bottom furnished with a wire cloth with a mesh size of 1 mm × 1 mm. This mesh cylinder is placed on a funnel with an outlet tube with a diameter of 1 cm, and the funnel is placed on top of a graduated cylinder (100 ml). The entire aggregate is left for 30 minutes at room temperature, whereafter the weight of drained liquid in the graduated cylinder is determined (A gram). The foam stability F.S. (percent) is defined by means of the formula:

$$F.S. = \frac{B - A}{B} \times 100 \text{ percent}$$

Baking properties of a meringue batter are to be evaluated as follows. To 100 ml containing 12 percent w/w (N×6.25) of the whipping or emulsifying agent produced according to the invention and exhibiting a pH of 7.0 is added 150 g saccharose. The saccharose is solubilized completely by gentle stirring at room temperature. The solution is then whipped at speed III (259 rpm) for 10 minutes in a Hobart mixer (model N-50) using a wire whisk. Immediately thereafter, ten 10 ml samples of the foam are transferred on an aluminum tray on ten separate positions by means of a syringe. Baking is performed at 130° C. for 1 hour. After cooling to ambient temperature, the weight and the overall volume of the meringues are determined and the apparent density calculated.

The superiority in regard to the whipping ability and the foam stability of the egg white substitute material prepared by the method according to the invention in comparison to the whipping ability and the foam stability of a corresponding known egg white substitute material made from acid precipitated soy isolate, appear from the following examples which illustrate the present invention. Also, the superiority of the baking properties of bake mixes containing the egg white substitute materials according to the invention in comparison with the baking properties of the bake mixes containing known egg white substitute materials appear from the following examples. The egg white substitute material according to the invention also exhibits excellent emulsifying properties.

EXAMPLE 1

Soy protein isolate was produced from defatted white soy flour (Aarhus Oliefabrik A/S) according to the ultrafiltration process described by Hans Sejr Olsen in Lebensm.-Wiss. U. Technol. 11, 57-64 (1978). A series of enzymatic hydrolysates were prepared exactly as described in the already cited article in the ACS Symposium Series 92 (page 127). The series consisted of hydrolysates having DH of 0% (not enzyme treated, outside invention), DH of 1%, DH of 2%, DH of 3%, DH of 4%, and DH of 6% (the hydrolysates with 1%≦DH≦6% being enzyme treated and in accordance with the present invention). The whipping expansions are shown versus DH in FIG. 6 of the accompanying drawings for both acid precipitated (results transferred from the above cited ACS paper) and for ultrafiltrated protein, prepared as above.

Figure 7:
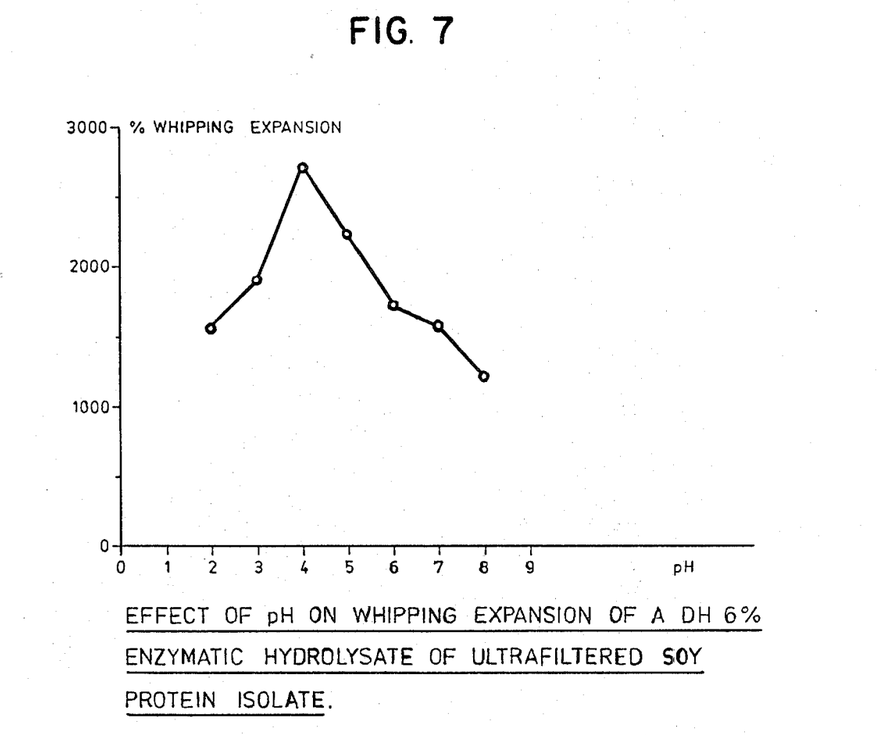
FIG. 7 is a graph of whipping expansion against whipping pH for one enzyme hydrolyzed soy protein isolate.

The whipping expansion was examined versus pH for the DH=6% hydrolysate of ultrafiltered soy protein isolate, the results being shown in FIG. 7 of the accompanying drawings, which demonstrates that greatest whipping expansion occurred at about pH 4.

EXAMPLES 2 to 4

For the sake of brevity and an improved comprehensive view the following three pilot plant examples will be described in relation to the flow sheets of the accompanying drawings and tables, demonstrating three production methods according to the invention and the results in terms of whipping properties.

The same type of equipment has been used in these three examples, namely

Centrifuge: Solids ejecting Centrifuge Westfalia SB 07.

Ultrafiltration apparatus: DDS-module 35 having 2.5 m² membrane area. Membrane type GR6-P from De Danske Sukkerfabrikker A/S.

Raw material: Defatted white soy flour (Aarhus Oliefabrik A/S).

Enzyme: ALCALASE ®0.6L produced by NOVO Industri A/S.

In Examples 2 to 4 all hydrolyses were performed with a proteolytic activity of 12 Anson units/kg of protein. In Examples 2 and 4, 11.5 kg of defatted white soy flour was extracted at pH of 8 using 108.5 l of water.

Also, in all of the following Examples only 150 ml of protein solution was used for the determination of the whipping expansion due to the incredibly high whipping expansion of the protein hydrolysates.

For the sake of comparison with the prior art methods, also results with proteins without hydrolysis and with acid precipitated proteins hydrolyzed to DH of 3% have been shown in the Tables in the following Examples, demonstrating the superior characteristics of the protein hydrolysate produced according to the invention.

EXAMPLE 2

The pilot plant production was carried out according to the flow sheet of FIG. 1. The whipping data shown in Table 1 demonstrates the effect of this production method in accordance with the invention.

TABLE 1

| Protein | Whipping Expansion (%) | | Foam stability (%) | |
|---|---|---|---|---|
| | at pH = 4.0 | at pH = 7.0 | at pH = 4.0 | at pH = 7.0 |
| Example 2 | 1900 | 833 | 100 | 20.3 |
| Without hydrolysis (ultrafiltered soy protein isolate) | 833 | 433 | 48.4 | 0 |
| Acid precipitated, hydrolysed to DH = 3% | 900 | 833 | 47.8 | 0 |

The product produced in Example 2 was found to exhibit baking properties like egg white when used as an egg white substitute in a meringue batter. The density measurements based on light meringues of each of the three proteins indicated in Table 1, and meringues made with fresh egg white, appears in the following Table 2.

TABLE 2

| Protein | Density of meringue (g/cm³) | ± Standard deviation |
|---|---|---|
| Example 2 | 0.11 | ±0.01 |
| Without hydrolysis (ultrafiltered soy protein isolate) | 0.15 | ±0.01 |
| Acid precipitated hydrolysed to DH = 3% | 0.30 | ±0.02 |
| Egg white | 0.12 | ±0.01 |

In addition, the flavour of the meringues produced according to the invention was very bland and neither bitterness nor beany taste could be detected.

EXAMPLE 3

Figure 2:
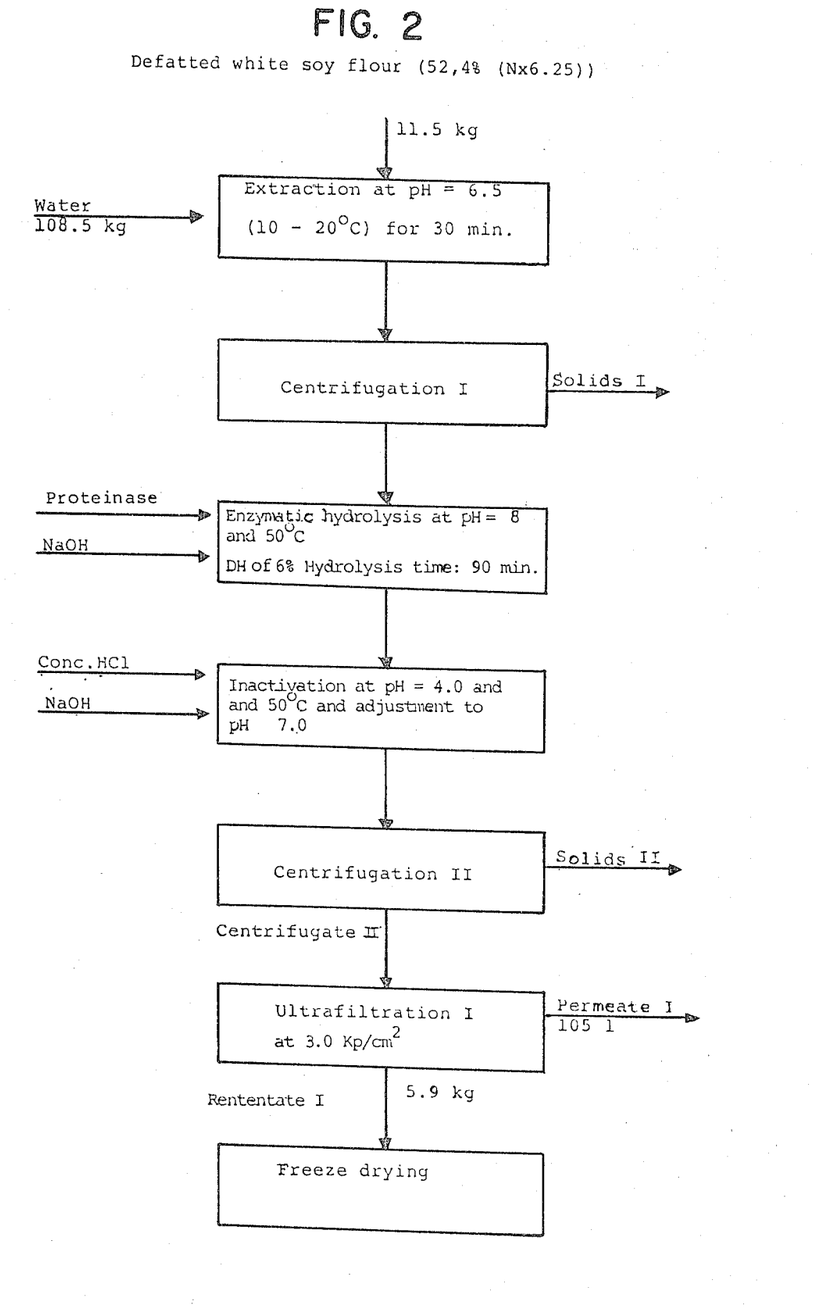
FIG. 2 illustrates in block form a second flow sheet for practice of this invention.

The pilot plant production was carried out according to the flow sheet of FIG. 2. Whipping data are shown in Table 3 and baking data are shown in Table 4.

TABLE 3

| Protein | Whipping expansion (%) at pH = 4.0 | Whipping expansion (%) at pH = 7.0 | Foam stability (%) at pH = 4.0 | Foam stability (%) at pH = 7.0 |
|---|---|---|---|---|
| Example 3 | 1817 | 1317 | 92.8 | 50 |
| Without hydrolysis (ultrafiltered soy protein isolate) | 833 | 433 | 48.4 | 0 |
| Acid precipitated, hydrolysed to DH = 3% | 900 | 833 | 47.8 | 0 |

TABLE 4

| Protein | Density of meringue (g/cm$^3$) | ± Standard deviation |
|---|---|---|
| Example 3 | 0.096 | ±0.004 |
| Without hydrolysis (ultrafiltered soy protein isolate) | 0.15 | ±0.01 |
| Acid precipitated hydrolysed to DH = 3% | 0.30 | ±0.02 |
| Egg white | 0.12 | ±0.01 |

EXAMPLE 4

The pilot plant production was carried out according to the flow sheet of FIG. 3. Whipping data are shown in Table 5 and baking data are shown in Table 6.

TABLE 5

| Protein | Whipping expansion (%) at pH = 4.0 | Whipping expansion (%) at pH = 7.0 | Foam stability (%) at pH = 4.0 | Foam stability (%) at pH = 7.0 |
|---|---|---|---|---|
| Example 4 | 2066 | 2484 | 100 | 69.2 |
| Without hydrolysis ultrafiltered soy protein isolate) | 833 | 433 | 48.4 | 0 |
| Acid precipitated, hydrolysed to DH = 3% | 900 | 833 | 47.8 | 0 |

TABLE 6

| Protein | Density of meringue (g/cm$^3$) | ± Standard deviation |
|---|---|---|
| Example 4 | 0.17 | ±0.02 |
| Without hydrolysis (ultrafiltered soy protein isolate) | 0.15 | ±0.01 |
| Acid precipitated hydrolysed to DH = 3% | 0.30 | ±0.02 |
| Egg white | 0.12 | ±0.01 |

EXAMPLE 5 to 8

Figure 4:
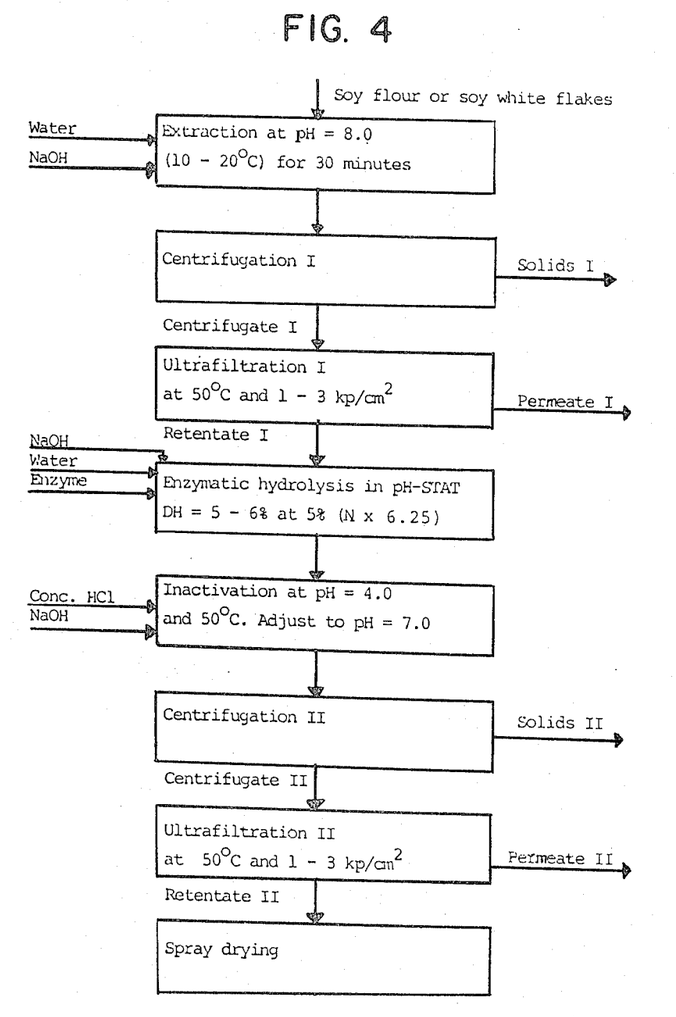
FIG. 4 illustrates in block form a fourth flow sheet for practice of this invention.

The following four pilot plant examples (5 to 8) were carried out according to the flow sheet of FIG. 4.

For the sake of brevity and comprehensive view the results of these examples will be described mainly by tables, demonstrating four productions carried out according to the flow sheet of FIG. 4, but with variations according to the following process characteristics:
a. Manufacturer of soymeal or white flakes.
b. Centrifuges.
c. Type of ultrafiltration modules.
d. Type of membranes in regard to cut-off-value.
e. Type of enzyme.

In Examples 5 to 8 all hydrolysis were performed with a proteolytic activity of 18 Anson units/kg of protein. In Examples 5 to 8, 50 kg of defatted soyflour was extracted at pH=8 using 500 l of water.

Solids ejecting centrifuge Westfalia SB07 (Westfalia for short) and the Alfa Laval decanter type NX-314 (Alfa Laval for short) were used in relation to flow sheet in the following manner:
Centrifugation I: either Westfalia or Alfa Laval followed by Westfalia.
Centrifugation II: Westfalia.

Spraydrying was carried out in a Niro Atomizer type S-12 plant using an atomizer wheel, and an air inlet temperature of max. 180° C. and an outlet temperature of max. 90° C.

EXAMPLE 5

The characteristics regarding the process are shown in Table 7 below:

TABLE 7

| | |
|---|---|
| Soy raw material | Defatted white soy flour (Aarhus Oliefabrik) |
| Ultrafiltration module | ROMICON-Hollow fibers (Alfa-Laval) Membrane area 4.8 m$^2$ |
| Membrane | Type PM30 Cut-off-value: 30.000 |
| Enzyme | Alcalase ® 0.6 L |

In Table 8 the mass and volumes of phases obtained at the different operations are shown. 50 g of soy flour was extracted by use of 500 l H$_2$O at pH=8.0.

TABLE 8

| Phases | Mass (kg) and volume (l) |
|---|---|
| Centrifugate I | 300 l |
| Solids I | 251 kg |
| Retentate I | 41 l |
| Permeate I | 299 l |
| Centrifugate II | 130 l |
| Solids II | 29 kg |
| Retentate II | 27 l |
| Permeate II | 103 l |

Whipping and baking data are shown in Table 9. Comparisons may be made to the whipping and baking data shown for the examples 2,3, and 4.

TABLE 9

| | | |
|---|---|---|
| Whipping expansion | at pH = 4.0 | 1567% |
| | at pH = 7.0 | 1233% |
| Foam stability | at pH = 4.0 | 100% |
| | at pH = 7.0 | 1% |
| Density of meringue | 0.08 g/cm$^3$ ± 0.01 | |

EXAMPLE 6

TABLE 10

| | |
|---|---|
| Soy raw material | White flakes 90 from Cargill |
| Centrifugation | Decanter NX 314 during the extraction |
| Ultrafiltration | ROMICON-Hollow fibers. (Alfa-Laval) Membrane area 4,8 m$^2$ |
| Membrane | Type PM30 Cut-off-value: 30.000 |

TABLE 10-continued

| Enzyme | Alcalase ® 0.6 l |
|---|---|

60 g of soy white flakes was extracted by use of 600 l H₂O at pH=8.0.

TABLE 11

| Phases | Mass (kg) or volume (l) |
|---|---|
| Centrifugate I (Decanter) | 560 l |
| Solids I (Decanter) | 103 kg |
| Centrifugate I (Centrifuge) | 450 l |
| Solids I (Centrifuge) | 118 kg |
| Retentate I | 50 l |
| Permeate I | 440 l |
| Centrifugate II | 140 l |
| Solids II | 131 kg |
| Retentate II | 20 l |
| Permeate II | 95 l |

TABLE 12

| | | |
|---|---|---|
| Whipping expansion | at pH = 4.0 | 2167% |
| | at pH = 7.0 | 1400% |
| Foam stability | at pH = 4.0 | 97% |
| | at pH = 7.0 | 49% |
| Density of meringue | 0.09 ± 0.01 g/cm³ | |

EXAMPLE 7

TABLE 13

| Soy raw material | Soy white flakes (533 WF09) (Aarhus Oliefabrik) |
|---|---|
| Ultrafiltration | DDS-module 35 Membrane area 2.5 m² |
| Membrane | Type GR81P Cut-off-value: 10,000 |
| Enzyme | Alcalase ® 0.6 l |

50 kg of soy white flakes was extracted by 500 l H₂O at pH=8.0.

TABLE 14

| Phases | Mass (kg) or volume (l) |
|---|---|
| Centrifugate I | 280 l |
| Solids I | 244 kg |
| Retentate I | 43 l |
| Permeate I | 237 l |
| Centrifugate II | 103 l |
| Solids II | 24 kg |
| Retentate II | 10 l |
| Permeate II | 93 l |

TABLE 15

| | | |
|---|---|---|
| Whipping expansion | at pH = 4.0 | 2067% |
| | at pH = 7.0 | 1900% |
| Foam stability | at pH = 4.0 | 54% |
| | at pH = 7.0 | 11% |
| Density of meringues | 0.16 ± 0.01 | |

EXAMPLE 8

TABLE 16

| Soy raw material | Soy white flakes (533 WF09) (Aarhus Oliefabrik) |
|---|---|
| Ultrafiltration | DDS-modul 35 Membrane area 2.5 m² |
| Membrane | Type GR-81P Cut-off-value: 10,000 |
| Enzyme | Neutrase ® 0.5 l |

TABLE 17

| Phases | Mass (kg) or volume (l) |
|---|---|
| Centrifugate I | 295 l |
| Solids I | 252 kg |
| Retentate I | 55 l |
| Permeate I | 240 l |
| Centrifugate II | 120 l |
| Solids II | 31 kg |
| Retentate II | 30 l |
| Permeate II | 90 l |

TABLE 18

| | | |
|---|---|---|
| Whipping expansion | at pH = 4.0 | 1067% |
| | at pH = 7.0 | 733% |
| Foam stability | at pH = 4.0 | 82% |
| | at pH = 7.0 | 0% |
| Density of meringues | 0.14 ± 0.03 g/cm³ | |

I claim:

1. In a method for producing an egg white substitute by water extracting defatted soybean material at a pH in the range of about 6-10.5, then subjecting the resulting extract to a hydrolyzing agent to effect proteolytic hydrolysis, with or without removal of the solid materials therefrom, and inactivating the hydrolyzing agent, the improvements which comprise:

hydrolyzing said extract to a degree of hydrolysis in the range of from 1 to 8 thereafter inactivating the hydrolyzing agent; and removing solid materials from the extract, if not previously done, to produce therefrom a supernatant; then subjecting the hydrolyzed supernatant to ultrafiltration, and thereafter recovering the egg white substitute from the retentate.

2. Method according to claim 1, wherein ultrafiltration is performed by a membrane with a nominal cut-off value for molecular weight in the range of about 1000 to 30,000.

3. A method according to claim 1, wherein the proteolytic hydrolysis is carried out prior to removal of solids.

4. A method according to claim 1, wherein the defatted soy bean material is extracted at a pH of around 8.0.

5. A method according to claim 1, wherein the ratio between the extraction ratio weight of the aqueous medium used for the extraction to the weight of the defatted soy bean material is $$5 \leq \frac{\text{weight of aqueous medium}}{\text{weight of soy bean material}} \leq 20$$

6. A method according to claim 1, wherein the supernatant is subjected to ultrafiltration and subsequently diafiltration, whereby final protein content in solution on a dry matter ratio is about 90 percent.

7. A method according to claim 1, wherein said ultrafiltration takes place at a temperature in the range of from ambient temperature to about 60° C.

8. A method according to claim 1, wherein the proteolytic hydrolysis is performed by a microbial proteolytic enzyme.

9. A method according to claim 8, wherein the proteolytic hydrolysis is performed by a bacterial protease produced by B. licheniformis.

10. A method according to claim 9, wherein the proteolytic hydrolysis is performed by addition of an acylated form of the bacterial protease.

11. A method according to claim 1, wherein the proteolytic hydrolysis is carried out with an enzyme dosage of at least 5 Anson units/kg of protein.

12. A method according to claim 1, wherein the concentration of protein in solution in the supernatant or fraction thereof is at least 2.5 percent w/w.

13. A method according to claim 1, wherein the proteolytic hydrolysis is carried out to a degree of hydrolysis in the range of from 3 to 8.

14. A method according to claim 1, wherein inactivation is performed by pH adjustment to at least 2 pH units below the optimum of the proteolytic enzyme used to perform the partial hydrolysis, and maintaining this pH for at least 30 minutes at 50° C.

15. A method according to claim 1, wherein said egg white substitute is isolated in solid form.

16. The process of claim 1 further comprising hydrolyzing after removal of solid materials from the extract.

17. A method according to claim 1, wherein two ultrafiltrations are performed, and wherein the first ultrafiltration precedes said proteolytic hydrolysis and said hydrolysis is performed on the retentate originating from said first ultrafiltration.

* * * * *